United States Patent [19]

Ruffolo

[11] Patent Number: 4,596,223

[45] Date of Patent: Jun. 24, 1986

[54] VACUUM POWERED HEAT EXCHANGER

[76] Inventor: Russ F. Ruffolo, 417 W. Geneva Rd., Glen Ellyn, Ill. 60137

[21] Appl. No.: 590,626

[22] Filed: Mar. 19, 1984

[51] Int. Cl.$^4$ ............................................ F02M 31/00
[52] U.S. Cl. ................................... 123/556; 123/552
[58] Field of Search ............... 123/556, 552, 590, 591; 261/144, 145; 55/267, 315, 418, 419

[56] References Cited

U.S. PATENT DOCUMENTS

| | | | |
|---|---|---|---|
| 1,160,192 | 11/1915 | Nelson | 123/556 |
| 1,347,043 | 7/1920 | Justice | 123/556 |
| 1,443,414 | 1/1923 | Johnson | 123/556 |
| 1,443,859 | 1/1923 | Allen | 123/556 |
| 1,855,308 | 4/1932 | Niven | 123/556 |
| 2,058,204 | 10/1936 | Ball | 123/556 |
| 2,084,991 | 6/1937 | Callahan | 123/556 |
| 2,123,347 | 7/1938 | Ware | 123/556 |
| 3,630,182 | 12/1971 | Grainger | 123/556 |
| 3,977,195 | 8/1976 | Treuil | 123/556 |

Primary Examiner—Ronald H. Lazarus

[57] ABSTRACT

A heat exchanger system for internal combustion engines, both spark (gas) and or self-ignition (diesel) and liquid or air-cooled engines in which a duct or enclosure, fabricated entirely of non-heat conducting materials, which completely surrounds the rear of existing heat exchanger, cooling coil, or cooling fins, removes excessive heat by ducted air being routed through disposable air-filter, then into the velocity accelerator section, from there into the plenum or accumulater section to be consumed by the engine. The improvement being that no excessive heat is allowed to accumulate or be discharged into the engine compartment, fan and pulley arrangement are eliminated, reducing noise and excessive power loss, filtered air is accelerated to super-sonic velocities to better atomize fuel, allowing for greater volumetric efficiency of cylinders, all work being performed by the pressure differentials produced within the engines cylinders during its intake cycles or strokes.

1 Claim, 2 Drawing Figures

VACUUM POWERED HEAT EXCHANGER

BACKGROUND OF THE INVENTION

1. Field of the Invention

The stated invention relates to the cooling or heat exchanging of internal combustion liquid or air-cooled gas or diesal engines coolant or lubrication systems, specifically suited for applications on low speed, stationary engines, or machines and vehicles operating in low noise level situations as required by E.P.A. or D.O.T. guide lines.

2. Background Art

In reference to Justice and O'Briens U.S. Pat. No. 1,347,043, July 20, 1920, my invention solves the problem of eliminating excessive heat from the engine compartment which is present in any application of Justice and O'Briens COOLING SYSTEM which by nature of its construction embodies an additional water jacket or manifold as part of the engines cylinder head which traverses the length of the engine block functioning as an additional heat-exchanger, creating an additional heat burden on the cooling ability of the conventional system, whereas my invention which embodies a disposable air-filter, a velocity accelerator section, a plenum, duct or enclosure fabricated from non-heat conducting materials, and is completely devoid of any type of manifold containing liquids for use as a coolant or lubricant, thereby, enabling my invention to be superior in efficiency, less expensive to manufacture, lighter in weight, easily adaptable to all engine applications, and construction is simplified.

In reference to Graingers U.S. Pat. No. 3,630,182, Dec. 28, 1971, my invention eliminates the use of a fan for introducing air through the radiator or cooling coils, achieving the movement of air through the radiator or cooling coil by the normal intake stroke, or cycle of the piston or pistons, whereas Grainger relies on a driven fan and pulley assembly with a series of tubes and pipes to rid the crankcase of fumes, in doing so, introducing more heat into the engine compartment by radiation. Graingers patent is an anti-pollution system for exhaust gas and fume elimination, whereas my invention is a self-contained and powered heat-exchanger system designed to be more efficient and less complex, therefore economical to construct in comparison to other heat-exchanger systems in use today.

SUMMARY OF THE INVENTION

The stated invention consists of a ducted radiator or cooling coil or fins, having within its formed air-tight enclosure, a disposable air-filter, velocity accelerator section, containing a multitude of honey-combed mini-venturi and plenum leading to an air intake manifold or carburetor, all of the above combined to form a heat removing system, accelerating filtered air at super-sonic speeds into the combustion area to better atomize the explosive mixtures, powered by the differential pressures produced between atmospheric and low pressures within swept area of cylinders and pistons. The major purpose of the invention is to provide a system with which to effectively rid coolants or lubricants of excessive heat, filter and accelerate the air, reduce under hood temperatures, reduce noise and fuel consumption levels by eliminating the fan and pulley, and electric fan, allowing the engine to operate more efficiently and economically at all levels of R.P.M. or work loads, all work being done by the intake stroke or cycle of the engines pistons.

BRIEF DESCRIPTION OF THE PREFERRED EMBODIMENT

Figure 1:
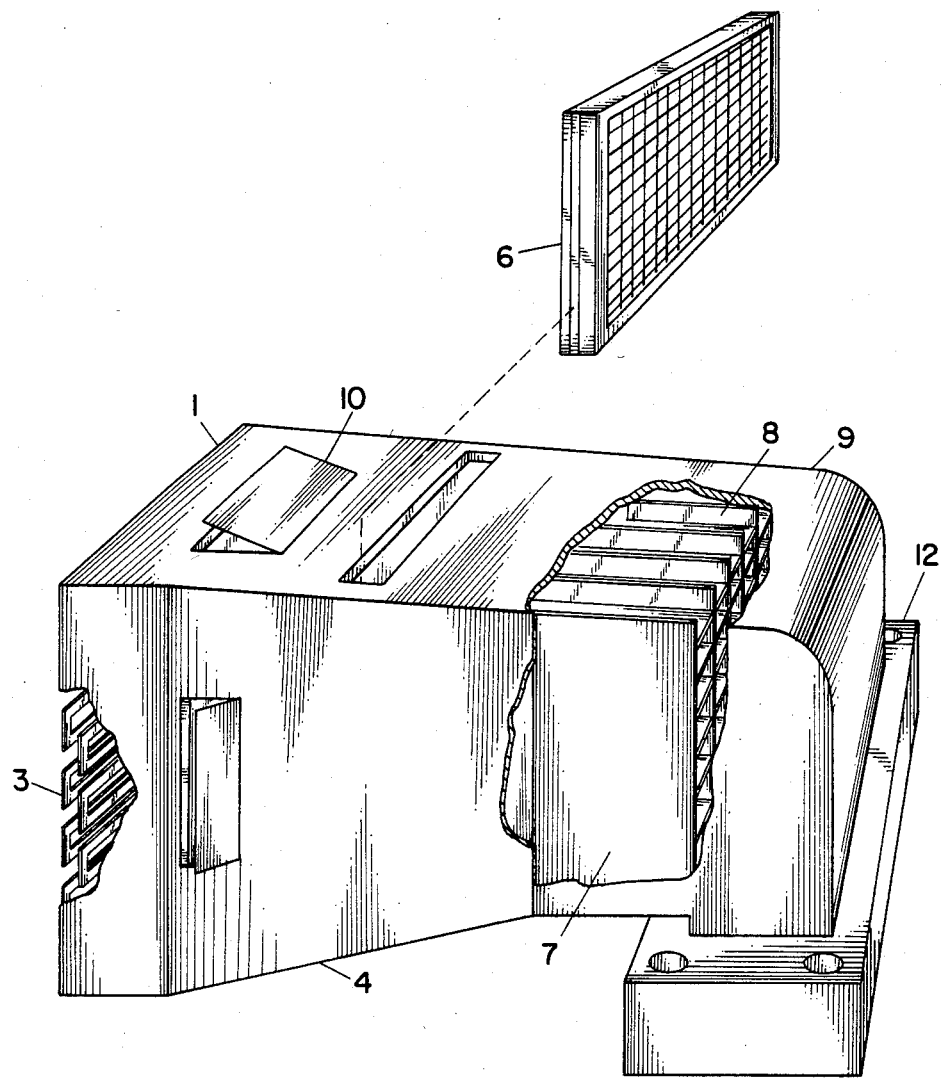
FIG. 1. Shows a dimensional view of the invention, showing cut-away views of the following sections: radiator, disposable air-filter, velocity accelerator with mini-venturi and plenum.
Figure 2:
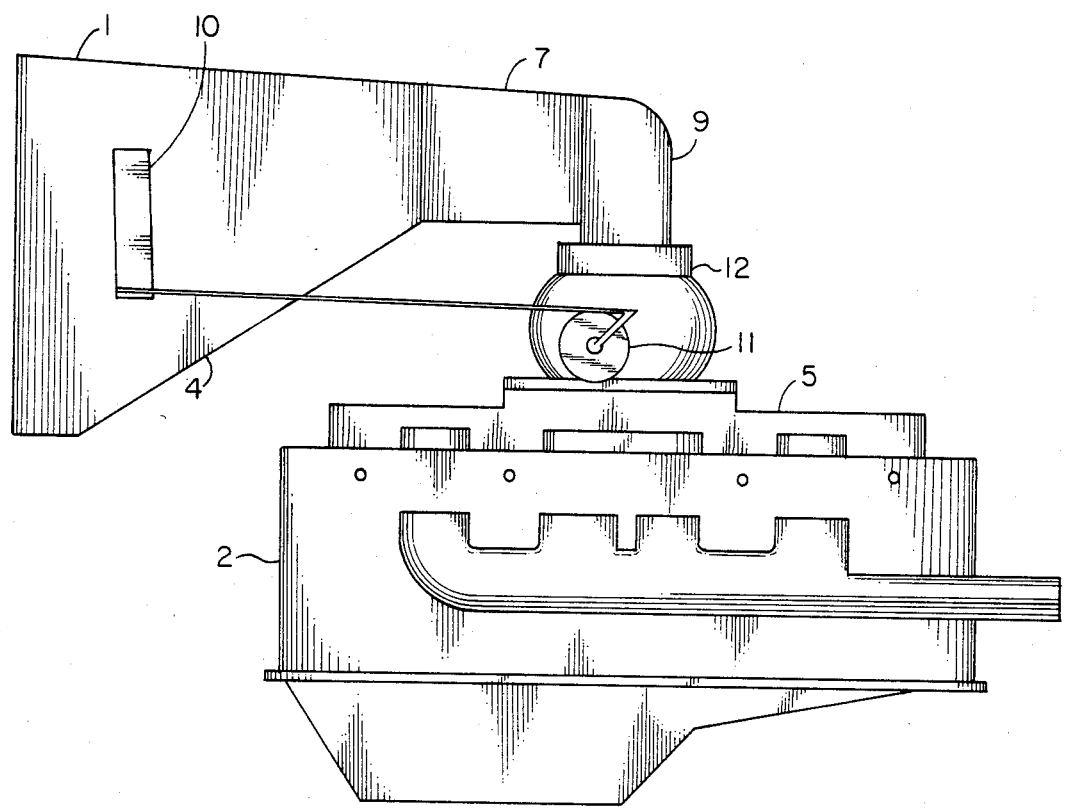
FIG. 2. Showing horizontal view of invention in ordinary placement on engine, manifold, carburetor and engine being designated by the numbers 2, and 5.

In reference to the drawing, the basic, simple construction of the heat-exchanger system 1 invented for internal combustion engines 2 either spark or self-ignition types, lends itself easily for description and function of its various sections. The radiator or coil, of tubing 3, containing coolant can be any size or shape, made of any material and is completely encircled or enclosed on one side of its outer perimeter of non-heat conducting material, forming an air-tight duct 4 the entire distance from the rear side of the radiator or tubing 3 containing coolant ending or terminating at the mating point of the flange 12, or intake manifold, or carburetor 5 of the internal combustion engine.

Within the enclosure or duct 4 there is provision for a disposable air-filter element 6. To the rear of this filter 6, within the non-heat conducting duct or enclosure 4 is the velocity accelerator section 7, a honey-combed arrangement of small tubes or venturi 8, to the rear of the velocity accelerator section 7, being located within the enclosure or duct 4 is the plenum 9, which exits into the intake manifold, air-horn or carburetor 5 of the internal combustion engine 2.

Provisions are allowed on all sides of the enclosure or duct 4 directly ahead of the disposable air-filter 6, for the installation of operable flaps 10, to be opened or closed, either manually, thermostatically, or by velocity control 11. The enclosed duct 4 is to be constructed entirely of non-heat conducting materials. The forward open end of the duct 4 is fastened or secured to the rear or one side of the radiator or coil 3 containing coolant to form an air-tight seal, so as to exclude any unwanted air from entering the duct or enclosure 4 other than from the frontal opening. The other end of the duct 4 is bolted to the carburetor or intake manifold 5 to provide an air-tight seal along said mounting flange 12.

In the performance of the invention, the internal combustion engine 2, having been started, will immediately draw air through the radiator 3, enclosure or duct 4, into the disposable air-filter 6, then continuing through, into the multitude of honey-combed mini-venturi 8, comprising the velocity accelerator section 7, thereupon exiting into the plenum area 9 of the enclosed duct 4. Finally, the filtered air having attained a high velocity or super-sonic speed, continues on into the intake manifold, air-horn or carburetor 5, to be consumed by the engine 2.

I claim:

1. In an internal combustion engine including an oil lubrication system, a liquid cooling system, and an improved air intake system, wherein the improved air intake system comprises: a housing including a first opening in one end, which opening is open to the atmosphere and a second opening comprising an air outlet opening in the other end open to the air intake manifold of the engine, a heat exchanger positioned in the first opening, said heat exchanger comprising a series of coils positioned in the flow path of the atmospheric air as it enters the housing, said heat exchanger being fluidly connected to either the engine lubrication system or the cooling system to provide a warm heat source for the incoming air to the housing, acceleration means positioned in the housing downstream of the heat exchanger, said acceleration means comprising a honey-comb structure positioned across the air intake flow path, said honey-comb structure including a multitude of honey-combed mini-venturi cells through which the heated air flows in an accelerated mode, a removable air filter positioned between the heat exchanger and the acceleration means and a single opening provided in the housing through which the air filter can be passed and removed, and additional openings in the housing positioned downstream of the heat exchanger and upstream of the air filter, said additional openings including movable flaps for opening and closing the openings to control the temperature of the air flowing through the housing.

* * * * *